United States Patent
Li

(10) Patent No.: US 12,395,959 B2
(45) Date of Patent: Aug. 19, 2025

(54) TA DETERMINATION METHOD AND APPARATUS, AND TERMINAL DEVICE

(71) Applicant: GUANGDONG OPPO MOBILE TELECOMMUNICATIONS CORP., LTD., Guangdong (CN)

(72) Inventor: Haitao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 384 days.

(21) Appl. No.: 17/934,311

(22) Filed: Sep. 22, 2022

(65) Prior Publication Data

US 2023/0010343 A1 Jan. 12, 2023

Related U.S. Application Data

(63) Continuation of application No. PCT/CN2020/080629, filed on Mar. 23, 2020.

(51) Int. Cl.
H04W 56/00 (2009.01)
H04B 7/185 (2006.01)

(52) U.S. Cl.
CPC ...... *H04W 56/005* (2013.01); *H04B 7/18513* (2013.01)

(58) Field of Classification Search
CPC .................. H04W 56/005; H04B 7/18513
See application file for complete search history.

(56) References Cited

U.S. PATENT DOCUMENTS

| 8,873,443 | B2* | 10/2014 | Haim .............. H04W 52/0216 |
| | | | 370/328 |
| 9,491,758 | B2* | 11/2016 | Sharma .............. H04W 72/23 |
| 10,541,802 | B2* | 1/2020 | Axmon ............... H04W 72/23 |
| 10,554,293 | B1* | 2/2020 | Chin ................. H04W 74/006 |
| 2019/0394770 | A1 | 12/2019 | Wang et al. |
| 2021/0105732 | A1* | 4/2021 | Takeda .............. H04W 56/0015 |
| 2021/0105761 | A1* | 4/2021 | Cheng .............. H04W 74/0833 |
| 2021/0153193 | A1* | 5/2021 | Lin ................. H04W 56/0045 |
| 2021/0321464 | A1 | 10/2021 | Lin |
| 2021/0345278 | A1* | 11/2021 | Takeda ................. H04W 52/02 |
| 2022/0046566 | A1* | 2/2022 | Leng ................. H04W 74/0833 |

(Continued)

FOREIGN PATENT DOCUMENTS

| CN | 105188128 A | 12/2015 |
| CN | 107197517 A | 9/2017 |

(Continued)

OTHER PUBLICATIONS

Second Office Action of the European application No. 20926686.5, issued on May 17, 2024. 6 pages.

(Continued)

*Primary Examiner* — Bailor C Hsu
(74) *Attorney, Agent, or Firm* — PERKINS COIE LLP

(57) ABSTRACT

A method for determining a TA and a terminal device are provided. The method comprises operations as follows. A terminal device calculates a first TA value according to position information of the terminal device and ephemeris information of a satellite. The terminal device determines a second TA value according to the first TA value and a first adjustment value. The second TA value is used by the terminal device to perform uplink synchronization.

16 Claims, 8 Drawing Sheets

(56) References Cited

U.S. PATENT DOCUMENTS

| | | | |
|---|---|---|---|
| 2022/0217790 A1 | 7/2022 | Qiu | |
| 2023/0131305 A1* | 4/2023 | Cozzo | H04W 72/0473 370/329 |
| 2023/0337161 A1* | 10/2023 | Ma | H04W 56/0045 |

FOREIGN PATENT DOCUMENTS

| | | |
|---|---|---|
| CN | 109842932 A | 6/2019 |
| CN | 110446254 A | 11/2019 |
| WO | 2019246276 A1 | 12/2019 |
| WO | 2020031120 A2 | 2/2020 |
| WO | 2021062666 A1 | 4/2021 |

OTHER PUBLICATIONS

Supplementary European Search Report in the European application No. 20926686.5, mailed on Mar. 29, 2023. 13 pages.

Huawei et al:"Random access with UE location information", 3GPP Draft; R2-1913785 Random Access With UE Location Information, 3rd Generation Partnership Project (3GPP), Mobile Competence Centre; 650, Route Des Lucioles; F-06921 Sophia-Antipolis Cedex; Fran vol. RAN WG2, No. Chongqing, China; Oct. 14, 2019-Oct. 18, 2019 Oct. 4, 2019 (Oct. 4, 2019), XP051805249. 3 pages.

Ericsson:"On NTN synchronization, random access, and timing advance", 3GPP Draft; R1-1912725, 3rd Generation Partnership Project (3GPP), Mobilecompetence Centre; 650, Route Des Lucioles; F-06921 Sophia-Antipolis Cedex; France vol. RAN WG1, No. Reno, USA; Nov. 18, 2019-Nov. 22, 2019 Nov. 8, 2019 (Nov. 8, 2019), XP051823562. 22 pages.

Panasonic: "Issues on Timing Advance and RACH for NTN", 3GPP Draft; R1-1906264 NTN Rach, 3rdgenerton Partnership Project (3GPP), Mobile Competence Centre; 650, Route Deslucioles; F-06921 Sophia-Antipolis Cedex; France vol. RAN WG1, No. Reno, USA; May 13, 2019-May 17, 2019May 1, 2019 (May 1, 2019), XP051708302. 4 pages.

International Search Report in the international application No. PCT/CN2020/080629, mailed on Dec. 16, 2020 with English translation (6 pages).

English translation of the Written Opinion of the International Search Authority in the international application No. PCT/CN2020/080629, mailed on Dec. 16, 2020 with English translation (8 pages).

First Office Action of the European application No. 20926686.5, issued on Nov. 23, 2023. 7 pages.

Third Office Action of the European application No. 20926686.5, issued on Nov. 20, 2024. 6 pages.

First Office Action of the Chinese application No. 202211505456.4, issued on May 26, 2025, 17 pages with English translation.

* cited by examiner

US 12,395,959 B2

TA DETERMINATION METHOD AND APPARATUS, AND TERMINAL DEVICE

CROSS REFERENCE TO RELATED APPLICATIONS

This is a continuation of International Application No. PCT/CN2020/080629, filed on Mar. 23, 2020, and entitled "TA DETERMINATION METHOD AND APPARATUS, AND TERMINAL DEVICE", the disclosure of which is hereby incorporated by reference in its entirety.

TECHNICAL FIELD

The embodiments of the disclosure relate to the technical field of mobile communication, and in particular to a method and apparatus for determining a Timing Advance (TA), and a terminal device.

BACKGROUND

In a terrestrial network, TA values maintained by a terminal device are all indicated through a network. Each time the terminal device receives a TA command, a previously maintained TA value plus a TA adjustment value carried in the TA command is used as the latest TA value.

Compared with the terrestrial network, a TA value between the terminal device in a Non-Terrestrial Network (NTN) and a satellite changes greatly. Since the TA value changes all the time, the terminal device will not always use the previously maintained TA value, but calculate a current TA value through positioning during uplink transmission. However, the TA value obtained in this mode has a certain deviation, which affects the accuracy of uplink synchronization.

BRIEF DESCRIPTION OF THE DRAWINGS

The drawings described herein are intended to provide a further understanding of the present disclosure and form a part of the present disclosure. The illustrative embodiments of the present disclosure and the description thereof are intended to explain the present disclosure and do not constitute pairwise an improper limitation of the present disclosure. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as an LTE system, an LTE Frequency Division Duplex (FDD) system, an LTE Time Division Duplex (TDD) system, a 5G communication system, or a future communication system.

Figure 1:
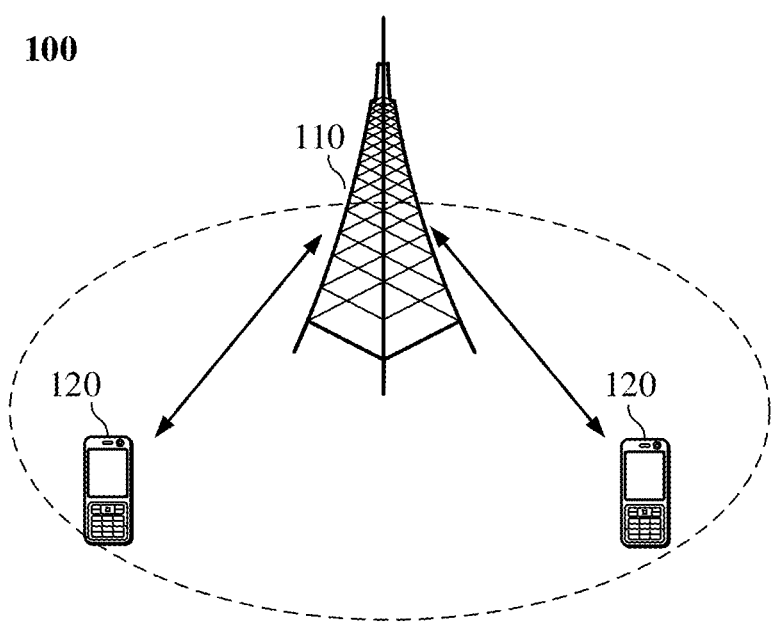
FIG. 1 is a schematic diagram of architecture of a communication system according to an embodiment of the present disclosure.

Exemplarily, a communication system 100 to which the embodiment of the present disclosure is applied is illustrated in FIG. 1. The communication system 100 may include a network device 110, which may be a device that communicates with a terminal 120. The network device 110 may provide communication coverage for a particular geographic area and may communicate with terminals located within the coverage area. Alternatively, the network device 110 may be an Evolutional Node B (eNB or eNodeB) in an LTE system, or may be a radio controller in a Cloud Radio Access Network (CRAN), or may be a mobile switching center, a relay station, an access point, a vehicle-mounted device, a wearable device, a hub, a switch, a bridge, a router, a network-side device in a 5G network, a network device in a future communication system, or the like.

The communication system 100 also includes at least one terminal 120 located within the coverage of the network device 110. The terminal 120 is connected to the network device 110 through a wired line or a wireless interface. A terminal 120 connected to the network device 110 through a wireless interface may be referred to as a "wireless communication terminal", a "wireless terminal" or a "mobile terminal". The terminal may refer to an access terminal, User Equipment (UE), a user unit, a user station, a mobile station, a mobile radio station, a remote station, a remote terminal, a mobile device, a user terminal, a terminal, a radio communication device, a user agent, or a user device, a cellular telephone, a cordless telephone, a Session Initiation Protocol (SIP) telephone, a Wireless Local Loop (WLL) station, a Personal Digital Assistant (PDA), a handheld device having a radio communication function, a computing device or other processing device connected to a radio modem, an in-vehicle device, a wearable device, a terminal in a 5G network, a terminal in the future evolved PLMN, or the like.

Alternatively, Device to Device (D2D) communication may be performed between the terminals 120.

Alternatively, a 5G communication system or 5G network may also be referred to as an NR system or an NR network.

FIG. 1 exemplarily illustrates a network device and two terminals. Alternatively, the communication system 100 may include a plurality of network devices and other numbers of terminals may be included within a coverage area of each network device, which are not limited in the embodiments of the present disclosure.

Alternatively, the communication system 100 may further include other network entities such as a network controller, a mobility management entity, which are not limited by the embodiments of the present disclosure.

It should be understood that a device having a communication function in a network/system in the embodiments of the present disclosure may be referred to as a communication device. As an example of the communication system 100 illustrated in FIG. 1, the communication system 100 may include a network device 110 and a terminal 120 having a communication function. The network device 110 and the terminal 120 may be specific devices described above, and details are not described herein. The communication system 100 may also include other devices, such as network controllers, mobility management entities, and other network entities, which are not limited in the embodiments of the present disclosure.

It should be understood that the terms "system" and "network" are used interchangeably herein. The term "and/or" in the disclosure means only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to facilitate understanding of the technical solutions of the embodiments of the present disclosure, the technical solutions related to the embodiments of the present disclosure are described below.

NTN

An NTN generally provides a communication service to terrestrial users in a satellite communication mode. Compared with terrestrial cellular network communication, satellite communication has many unique advantages. Firstly, the satellite communication is not limited by the geographical area of users. For example, general terrestrial communication cannot cover the areas where the communication devices cannot be set up or the areas without communication coverage due to the scarcity of population, such as oceans, mountains, and deserts. For the satellite communication, since one satellite can cover large ground and the satellite can orbit around the earth, theoretically every corner on the earth can be covered by the satellite communication. Secondly, the satellite communication has great social value. The satellite communication can cover remote mountainous areas and poor and backward countries or regions with low cost, so that people in these regions can enjoy advanced voice communication and mobile Internet technologies, which is conducive to narrowing the digital divide with developed regions and promoting the development of these regions. Thirdly, the distance of the satellite communication is long, and the cost of communication does not increase significantly with the increase of communication distance. Finally, the satellite communication has high stability and is not limited by natural disasters.

Communication satellites are divided into Low Earth Orbit (LEO) satellites, Medium Earth Orbit (MEO) satellites, Geostationary Earth Orbit (GEO) satellites, High Elliptical Orbit (HEO) satellites, etc. according to different orbital heights. The LEO and the GEO are main research objects.

1) LEO

The LEO has the height range of 500 km to 1500 km, and the corresponding orbital period of about 1.5 hours to 2 hours. The signal propagation delay of single hop communication between users is generally less than 20 ms. The maximum satellite viewing time is 20 minutes. The signal propagation distance is short, the link loss is low, and the requirement on the transmission power of the terminal device is not high.

2) GEO

The GEO has the orbital height of 35786 km and a rotation period of 24 hours around the earth. The signal propagation delay of the single hop communication between the users is generally 250 ms.

In order to ensure the coverage of a satellite and improve the system capacity of the whole satellite communication system, the satellite covers the ground by using a plurality of beams. One satellite can form dozens or even hundreds of beams to cover the ground. The beams of one satellite can cover a ground area with a diameter of tens to hundreds of kilometers.

NR Uplink TA

An important feature of uplink transmission is that different terminal devices have orthogonal multiple access on time and frequency. That is, uplink transmissions of different terminal devices from the same cell do not interfere with each other.

In order to ensure the orthogonality of uplink transmissions and avoid intra-cell interference, the base station requires that signals from different terminal devices at the same time but with different frequency domain resources arrive at the base station at basically aligned time. In order to ensure time synchronization at the base station side, NR supports a mechanism of uplink timing advance.

An uplink clock and a downlink clock on the base station side are the same, and there is an offset (the amount of the offset is an uplink TA value, referred to as a TA value for short) between the uplink clock and the downlink clock on the terminal device side. Different terminal devices have different TA values. By properly controlling the TA value of each terminal device, the base station can control the time when the uplink signals from different terminal devices arrive at the base station. For the terminal device far away from the base station, due to the large transmission delay, it is necessary to send uplink data in advance than the terminal device close to the base station.

The base station determines the TA value of each terminal device based on measuring the uplink transmission of the terminal device. The base station sends a TA command to the terminal device in two modes.

1) Acquisition of an initial TA value: in a random access process, the base station determines a TA value by measuring a received preamble, and sends the TA value to the terminal device through a Timing Advance Command field in a Random Access Response (RAR).

2) Adjustment of the TA value in a Radio Resource Control (RRC) connected state: although in the random access process, the terminal device realizes uplink synchronization with the base station, but the timing of the uplink signal arriving at the base station may change with time. Therefore, the terminal device needs to constantly update the TA value thereof to maintain the uplink synchronization. If the TA value of a certain terminal device needs to be corrected (or updated), the base station will send a TA command to the terminal device to require the terminal device to adjust the uplink timing thereof. The TA command is sent to the terminal device through a Timing Advance Command Media Access Control Control Element (MAC CE), which carries a TA adjustment value.

In an NR terrestrial network, the TA values maintained by the terminal device are all indicated through the network, including the TA value indicated in the RAR and the TA adjustment value indicated in the TA Command MAC CE. Each time the terminal device receives a TA command, the terminal device uses a previously maintained TA value plus an adjustment value carried in the TA command as the latest TA value.

Compared with the cellular network used by traditional NR, the timing offset between the terminal device and the satellite in the NTN changes greatly (that is, the TA value changes greatly), particularly, in the LEO satellite scenario. Since the TA value changes all the time, the terminal device will not always use the previously maintained TA value, but calculate a current TA value through positioning during uplink transmission. However, there is no solution for how to use the TA adjustment value previously sent by the network. Therefore, the following technical solutions of the embodiments of the present disclosure are proposed. The technical solutions of the embodiments of the present disclosure propose a new method for determining a TA for the terminal device with positioning capability.

Figure 2:
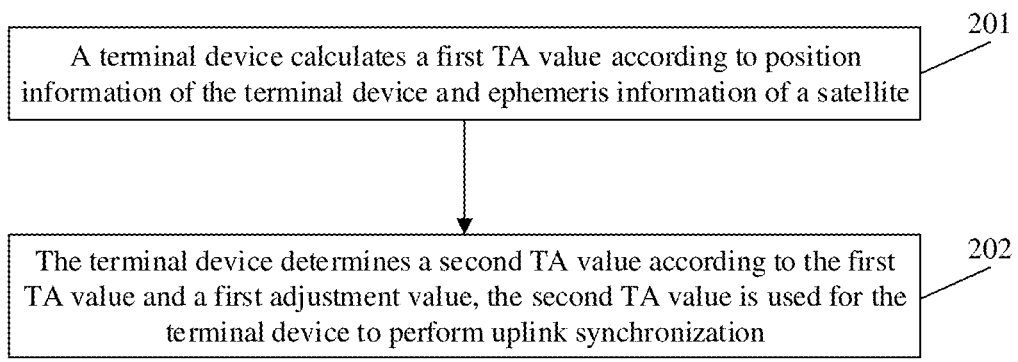
FIG. 2 is a schematic flowchart of a method for determining a TA according to an embodiment of the present disclosure.

FIG. 2 is a schematic flowchart of a method for determining a TA according to an embodiment of the present disclosure. As shown in FIG. 2, the method for determining a TA includes the following operations.

At operation 201: a terminal device calculates a first TA value according to position information of the terminal device and ephemeris information of a satellite.

In the embodiment of the present disclosure, the terminal device calculates a current TA value (that is, the first TA value) according to the position information of the terminal device and the ephemeris information of the satellite.

In the embodiment of the present disclosure, the terminal device has a positioning function, such as a Global Positioning System (GPS) positioning function. The terminal device obtains the position information itself through the positioning function thereof. Optionally, the position information may be denoted through longitude and latitude coordinates of the earth.

In the embodiment of the present disclosure, the satellite refers to a communication satellite, such as an LEO satellite, an MEO satellite, and a GEO satellite. The ephemeris information of the satellite refers to a table of precise positions or trajectories of the satellite that change with time. Optionally, the ephemeris information of the satellite may be stored on the terminal device side in a pre-configured mode, or, the ephemeris information of the satellite may also be broadcast to the terminal device by the satellite. The terminal device may determine the position of the satellite according to the ephemeris information of the satellite.

In the embodiment of the present disclosure, the terminal device may calculate a timing offset of the terminal device relative to the satellite according to the position information of the terminal device and the position of the satellite, and the timing offset is the first TA value.

In an optional mode, the terminal device calculates the distance of the terminal device relative to the satellite according to the position information of the terminal device and the position of the satellite. The first TA value may be obtained by dividing the distance by the speed of light (that is, the propagation speed of a communication signal) and multiplying by 2.

At operation 202, the terminal device determines a second TA value according to the first TA value and a first adjustment value. The second TA value is used for the terminal device to perform uplink synchronization.

In the embodiment of the present disclosure, the determination of the first adjustment value may be implemented in the following two modes.

First Mode

The terminal device receives first signaling sent by a network device. The first signaling carries the first adjustment value.

In an optional mode, the first signaling is a first TA command. That is, the first adjustment value is a TA adjustment value carried in the first TA command.

Here, the time when the terminal device receives the first TA command may have the following cases.

Case 1), the first TA command is a TA command received by the terminal device before calculating the first TA value.

Optionally, the first TA command is a last TA command received by the terminal device before calculating the first TA value.

Case 2), the first TA command is a TA command received by the terminal device when calculating the first TA value.

Optionally, the first TA command is a last TA command received by the terminal device when calculating the first TA value.

Case 3), the first TA command is a TA command received by the terminal device after calculating the first TA value.

Optionally, the first TA command is a last TA command received by the terminal device after calculating the first TA value.

It is to be noted that the closer the receiving time of the first TA command is to the calculation time of the first TA value, the higher the accuracy of a second TA calculated according to the first TA value and the first adjustment value in the first TA command.

A) In an optional mode, the first TA command is a TA command carried in the RAR. In this case, the terminal device receives the RAR sent by the network device, and determines a TA adjustment value carried in the TA command in the RAR to be the first adjustment value.

Further, before the terminal device receives the RAR sent by the network device, the terminal device sends a first message to the network device based on a pre-compensated TA value. The first message includes a preamble (that is, the first message is Msg1). The TA adjustment value carried in the TA command in the RAR is determined by the network device based on an uplink timing of the first message. The uplink timing of the first message is determined by the terminal device based on the pre-compensated TA value.

In an optional mode, the pre-compensated TA value is calculated by the terminal device according to the position information of the terminal device and the ephemeris information of the satellite. Further, specifically, the terminal device calculates the distance of the terminal device relative to the satellite according to the position information of the terminal device and the position information of the satellite (the position information of the satellite may be determined based on the ephemeris information of the satellite), and the pre-compensated TA value may be obtained by dividing the distance by the speed of light (that is, the propagation speed of a communication signal) and multiplying by 2.

In specific implementation, in a case that the terminal device needs to send the first message, a TA value is calculated according to the current position information of the terminal device and the ephemeris information of the satellite, and the first message is sent by taking the TA value as a pre-compensated TA value. It is to be noted that the operation that the terminal device sends the first message based on the pre-compensated TA value specifically refers to that: the terminal device determines the uplink timing (that is, an uplink synchronization clock) based on the pre-compensated TA value, and sends the first message based on the uplink timing. After receiving the first message, the network device may determine the TA adjustment value based on the receiving time of the first message and the uplink timing of the first message, and carry the TA adjustment value in the TA command in the RAR and feed it back to the terminal device.

Here, since the sending of the first message is subjected to TA pre-compensation, the network actually determines a TA adjustment value rather than a TA absolute value when determining the TA value. The TA adjustment value is used to determine the offset relative to the currently used TA value, and the TA absolute value is used to determine a TA value to be updated.

In an example, the last TA command received by the terminal device before calculating the first TA value is the TA command carried in the RAR. The terminal device may obtain a second TA value by adding the TA adjustment value carried in the TA command in the RAR to a latest calculated first TA value. The terminal device performs uplink synchronization (or uplink transmission) by using the second TA value.

B) In another optional mode, the first TA command is a TA command carried in the MAC CE. In this case, the terminal device receives the MAC CE sent by the network device, and determines the TA adjustment value carried in the TA command in the MAC CE to be the first adjustment value.

In an example, the last TA command received by the terminal device before calculating the first TA value is the TA command carried in the MAC CE. The terminal device may obtain a second TA value by adding the TA adjustment value carried in the TA command in the MAC CE to a latest calculated first TA value. The terminal device performs uplink synchronization (or uplink transmission) by using the second TA value.

It is to be noted that the MAC CE in the abovementioned solution may also be called a Timing Advance Command MAC CE.

Second Mode

The first adjustment value is determined based on N TA commands received by the terminal device, and N is a positive integer. Specifically, the terminal device receives N TA commands, and determines an accumulated value of N TA adjustment values carried in the N TA commands to be the first adjustment value. Each of the N TA commands carries a respective TA adjustment value.

It is to be noted that different TA commands in the N TA commands correspond to different receiving times. For example: the terminal device receives TA command 1 at time T1, receives TA command 2 at time T2, and receives TA command 3 at time T3. Here, the time when the terminal device receives the N TA commands may have the following cases.

Case 1), the terminal device receives the N TA commands before calculating the first TA value.

Case 2), the terminal device receives a part of the N TA commands before calculating the first TA value, and receives another part of the N TA commands after calculating the first TA value.

Case 3), the terminal device receives the N TA commands after calculating the first TA value.

In the embodiment of the present disclosure, the N TA commands include at least one of:
at least one TA command carried in an RAR; or
at least one TA command carried in a MAC CE.

Here, for the TA command carried in the RAR, the terminal device sends a first message associated with the RAR to the network device based on a pre-compensated TA value. The first message includes a preamble (that is, the first message is Msg1). The TA adjustment value carried in the TA command in the RAR is determined by the network device based on an uplink timing of the first message. The uplink timing of the first message is determined by the terminal device based on the pre-compensated TA value.

In an optional mode, the pre-compensated TA value is calculated by the terminal device according to the position information of the terminal device and the ephemeris information of the satellite. Further, specifically, the terminal device calculates the distance of the terminal device relative to the satellite according to the position information of the terminal device and the position information of the satellite (the position information of the satellite may be determined based on the ephemeris information of the satellite), and the pre-compensated TA value may be obtained by dividing the distance by the speed of light (that is, the propagation speed of a communication signal) and multiplying by 2.

In specific implementation, in a case that the terminal device needs to send the first message, a TA value is calculated according to the current position information of the terminal device and the ephemeris information of the satellite, and the first message is sent by taking the TA value as a pre-compensated TA value. It is to be noted that the operation that the terminal device sends the first message based on the pre-compensated TA value specifically refers to that: the terminal device determines the uplink timing (that is, an uplink synchronization clock) based on the pre-compensated TA value, and sends the first message based on the uplink timing. After receiving the first message, the network device may determine the TA adjustment value based on the receiving time of the first message and the uplink timing of the first message, and carry the TA adjustment value in the TA command in the RAR and feed it back to the terminal device.

In an example, a local variable is maintained on the terminal device side, called a first TA variable. The initial value of the first TA variable is zero. If the terminal device receives a TA command, the TA adjustment value carried in the TA command is accumulated into the first TA variable. Thus, N TA adjustment values received by the terminal device may be accumulated into the first TA variable. That is, the value of the first TA variable is the first adjustment value. For example: the terminal device receives N TA commands before calculating the first TA value. The value of the first TA variable is an accumulated value of the N TA adjustment values carried in the N TA commands.

A) In an optional mode, the terminal device receives an RAR, and a TA command in the RAR carries an adjustment value. In this case,
I), if the terminal device sends a first message associated with the RAR before receiving the RAR based on the pre-compensated TA value, then the terminal device accumulates the TA adjustment value carried in the TA command in the RAR into the first TA variable.

Here, since the sending of the first message is subjected to TA pre-compensation, the network device actually determines a TA adjustment value rather than a TA absolute value when determining the TA value. The terminal device obtains a TA adjustment value from the RAR sent by the network device, and accumulates it into the first TA variable.

II), if the terminal device sends the first message before receiving the RAR in a case that the TA pre-compensation is not performed, then the terminal device will not accumulate the TA adjustment value carried in the TA command in the RAR into the first TA variable.

Here, since the first message is sent without TA pre-compensation, the network device actually determines a TA absolute value when determining the TA value. The terminal device will not accumulate the TA absolute value in the RAR into the first TA variable.

B) In another optional mode, the terminal device receives a MAC CE, and a TA command in the MAC CE carries a TA adjustment value. In this case, the terminal device accumulates the TA adjustment value carried in the TA command in the MAC CE into the TA variable.

It is to be noted that the MAC CE in the abovementioned solution may also be called a Timing Advance Command MAC CE.

In an example, the terminal device reads a value of the first TA variable after calculating the first TA value, and may obtain a second TA value by adding the value of the first TA variable to the calculated first TA value. The terminal device performs uplink synchronization (or uplink transmission) by using the second TA value.

In the embodiment of the present disclosure, optionally, if the terminal device does not receive any TA command (such as a TA command in the RAR, a TA command in the MAC CE) before calculating the first TA value, then the terminal device performs uplink synchronization (or uplink transmission) by using the calculated first TA value.

It should be noted that the network in the embodiment of the present disclosure refers to a network implemented by a satellite.

The technical solutions of the embodiments of the present disclosure will be described below with reference to specific application examples.

First Example

The terminal device calculates a current TA value (that is, the first TA value) according to position information of the terminal device and ephemeris information of the satellite, obtains a new TA value (that is, the second TA value) after adding the latest received TA adjustment value to the calculated TA value, and performs uplink transmission by using the new TA value. The specific implementation process is as follows.

1. The terminal device in a connected state calculates the current TA value according to the position information of the terminal device and the ephemeris information of the satellite. If no TA command has been received previously, the terminal device performs uplink transmission by using the calculated TA value.
2. The terminal device receives a TA command from the network side, in which a TA adjustment value is indicated (recorded as delta_TA).
3. The terminal device recalculates the current TA value according to the position information of the terminal device and the ephemeris information when performing next uplink transmission, and the current TA value is added with the previously received TA adjustment value as a latest TA value to perform uplink transmission.

It is to be noted that the terminal device maintains the TA adjustment value indicated in the latest TA command all the time, and the TA adjustment value is added to the latest calculated TA value.

Figure 3:
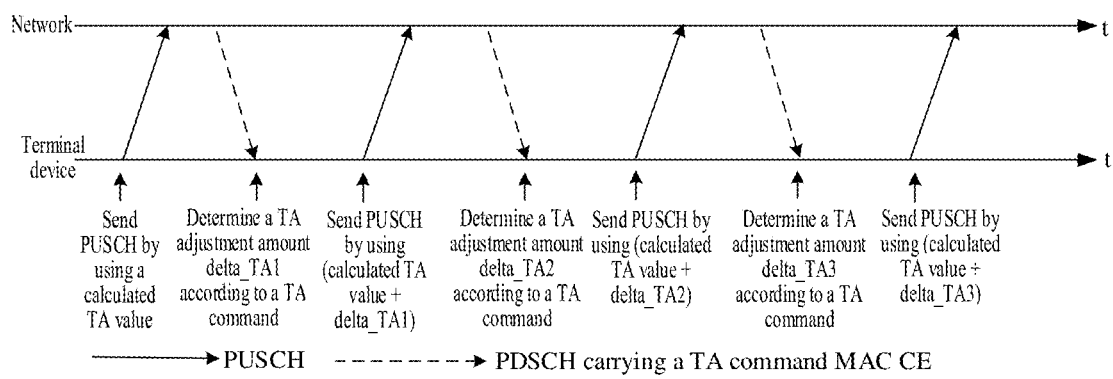
FIG. 3 is a schematic diagram of TA determination of a first example according to an embodiment of the present disclosure.

Referring to FIG. 3, the terminal device determines a TA adjustment amount according to the TA command in the Timing Advance Command MAC CE after receiving a Physical Downlink Shared Channel (PDSCH) carrying the Timing Advance Command MAC CE from the network side, such as delta_TA1, delta_TA2, and delta_TA3 in FIG. 3. The terminal device sends a Physical Uplink Shared Channel (PUSCH) by using a new TA value obtained by adding the calculated TA value to the last obtained TA adjustment value.

In the technical solution of the embodiment of the present disclosure, since high-speed movement of the satellite, the TA values calculated by the terminal device with the positioning capability may be different at different times. For the last TA adjustment value sent by the network, the terminal device does not simply add the TA adjustment value to the last calculated TA value, but recalculates the TA value considering the change of the TA value itself and adds the TA adjustment value to the newly calculated TA value.

Second Example

A local variable (that is, the first TA variable) is maintained on the terminal device side, the TA adjustment values in all previously received TA commands are accumulated into the local variable. The terminal device calculates a current TA value (that is, the first TA value) according to position information of the terminal device and ephemeris information of the satellite, obtains a new TA value (that is, the second TA value) after adding the calculated TA value to the value of the local variable, and performs uplink transmission by using the new TA value. The specific implementation process is as follows.

1. The terminal device in a connected state calculates the current TA value according to the position information of the terminal device and the ephemeris information of the satellite. If no TA command has been received previously, the terminal device performs uplink transmission by using the calculated TA value.
2. The terminal device side maintains a local variable (such as, delta_TA), the initial value of the local variable is set to be zero. The terminal device receives a TA command from the network side, in which a TA adjustment value is indicated. The terminal device accumulates the TA adjustment value into delta_TA.
3. The terminal device recalculates the current TA value according to the position information of the terminal device and the ephemeris information when performing next uplink transmission, and the current TA value is added with the value of delta_TA maintained locally by the terminal device as a latest TA value to perform uplink transmission.

It is to be noted that, when the terminal device initiates a random access process, if the terminal device is subjected to TA pre-compensation when sending Msg1, then the terminal device also accumulates the TA adjustment value indicated in RAR into the local variable delta_TA. If the terminal device sends Msg1 without TA pre-compensation, then the terminal device will not accumulate the TA adjustment value indicated in RAR into the local variable delta_TA.

Figure 4:
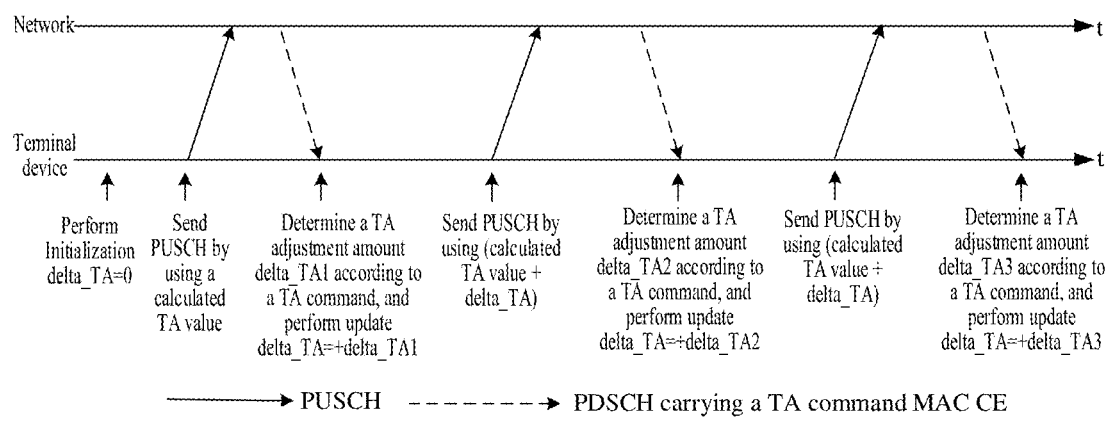
FIG. 4 is a schematic diagram of TA determination of a second example according to an embodiment of the present disclosure.

Referring to FIG. 4, the terminal device determines a TA adjustment amount according to the TA command in the Timing Advance Command MAC CE after receiving a PDSCH carrying the Timing Advance Command MAC CE from the network side, such as delta_TA1, delta_TA2, and delta_TA3 in FIG. 4. The terminal device accumulates the TA adjustment amount determined by the TA command into delta_TA. The terminal device sends a PUSCH by using a new TA value obtained by adding the calculated TA value to the value of the delta_TA.

In the technical solution of the embodiment of the present disclosure, since high-speed movement of the satellite, the TA values calculated by the terminal device with the positioning capability may be different at different times. For the last TA adjustment value sent by the network, the terminal device does not simply add the TA adjustment value to the last calculated TA value, but recalculates the TA value considering the change of the TA value itself and adds the historically accumulated TA adjustment value to the newly calculated TA value, which is helpful to smooth the calculation error of TA and make the TA adjustment more stable.

Figure 5:
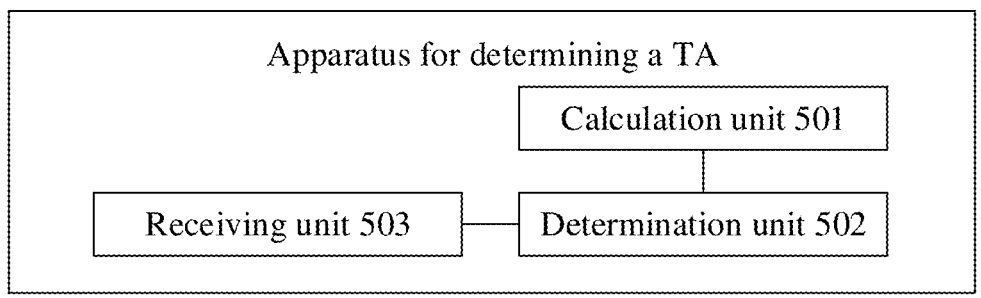
FIG. 5 is a schematic structural diagram of an apparatus for determining a TA according to an embodiment of the present disclosure.

FIG. 5 is a schematic structural diagram of an apparatus for determining a TA according to an embodiment of the present disclosure, and the apparatus is applied to the terminal device. As shown in FIG. 5, the apparatus for determining a TA includes a calculation unit 501 and a determination unit 502.

The calculation unit 501 is configured to calculate a first TA value according to position information of the terminal device and ephemeris information of a satellite.

The determination unit 502 is configured to determine a second TA value according to the first TA value and a first adjustment value. The second TA value is used for the terminal device to perform uplink synchronization.

In an optional mode, the apparatus further includes a receiving unit 503.

The receiving unit 503 is configured to receive first signaling sent by a network device. The first signaling carries the first adjustment value.

In an optional mode, the first signaling is a first TA command.

In an optional mode, the first TA command is a TA command received by the terminal device before calculating the first TA value; or
the first TA command is a TA command received by the terminal device when calculating the first TA value; or
the first TA command is a TA command received by the terminal device after calculating the first TA value.

In an optional mode, the first TA command is a last TA command received by the terminal device before calculating the first TA value; or
the first TA command is a last TA command received by the terminal device when calculating the first TA value; or
the first TA command is a last TA command received by the terminal device after calculating the first TA value.

In an optional mode, in a case that the first TA command is a TA command carried in an RAR,
the receiving unit 503 is configured to receive the RAR sent by the network device;
the determination unit 502 is configured to determine a TA adjustment value carried in the TA command in the RAR to be the first adjustment value.

In an optional mode, in a case that the first TA command is a TA command carried in a MAC CE,
the receiving unit 503 is configured to receive the MAC CE sent by the network device;
the determination unit 502 is configured to determine a TA adjustment value carried in the TA command in the MAC CE to be the first adjustment value.

In an optional mode, the first adjustment value is determined based on N TA commands received by the terminal device, and N is a positive integer.

In an optional mode, the apparatus further includes a receiving unit 503.

The receiving unit 503 is configured to receive the N TA commands.

The determination unit 502 is configured to determine an accumulated value of N TA adjustment values carried in the N TA commands to be the first adjustment value. Each of the N TA commands carries a respective TA adjustment value.

In an optional mode, the receiving unit 503 is configured to:
receive the N TA commands before calculating the first TA value; or
receive a part of the N TA commands before calculating the first TA value, and receive the another part of the N TA commands after calculating the first TA value; or
receive the N TA commands after calculating the first TA value.

In an optional mode, the N TA commands include at least one of:
at least one TA command carried in an RAR; or
at least one TA command carried in a MAC CE.

In an optional mode, the TA adjustment value carried in the TA command in the RAR is determined by the network device based on an uplink timing of a first message, and the first message is sent by the terminal device to the network device.

In an optional mode, the uplink timing of the first message is determined by the terminal device based on a pre-compensated TA value.

In an optional mode, the pre-compensated TA value is calculated by the terminal device according to the position information of the terminal device and the ephemeris information of the satellite.

In an optional mode, the first message includes a preamble.

It should be understood by the skilled in the art that the related description of the above apparatus for determining a TA in the embodiments of the present disclosure may be understood with reference to the related description of the method for determining a TA in the embodiments of the present disclosure.

Figure 6:
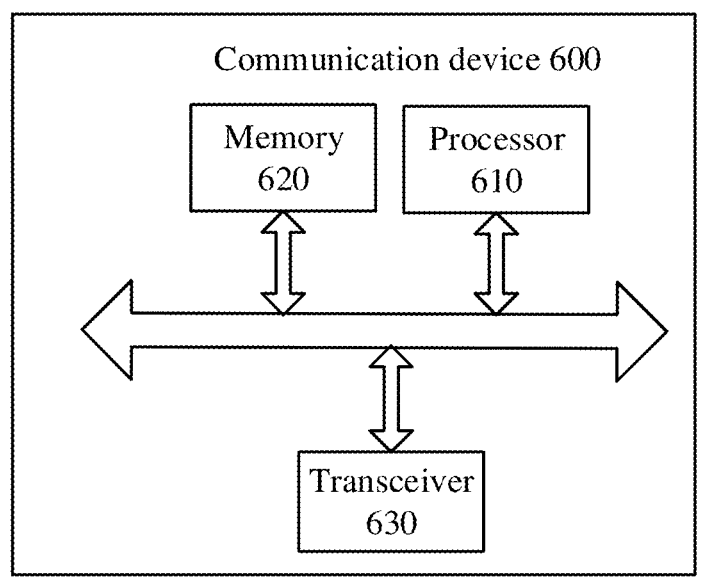
FIG. 6 is a schematic structural diagram of a communication device according to an embodiment of the present disclosure.

FIG. 6 is a schematic structural diagram of a communication device 600 according to an embodiment of the present disclosure. The communication device may be a terminal device or a network device. The communication device 600 illustrated in FIG. 6 includes a processor 610 that may invoke and execute a computer program from a memory to implement the method of the embodiments of the present disclosure.

Alternatively, as illustrated in FIG. 6, the communication device 600 may further include a memory 620. The processor 610 may invoke and execute a computer program from the memory 620 to implement the method of the embodiments of the present disclosure.

The memory 620 may be a separate device independent of the processor 610, or may be integrated into the processor 610.

Alternatively, as illustrated in FIG. 6, the communication device 600 may further include a transceiver 630 that may be controlled by the processor 610 to communicate with other devices, in particular, to send information or data to other devices, or to receive information or data from other devices.

The transceiver 630 may include a transmitter and a receiver. The transceiver 630 may further include antennas. The number of antennas may be one or more.

Alternatively, the communication device 600 may be the network device of the embodiments of the disclosure, and the communication device 600 may implement the corresponding operations implemented by the network device in each method of the embodiments of the disclosure. For brevity, details are not described herein.

Alternatively, the communication device 600 may be the mobile terminal/terminal device of the embodiments of the disclosure, and the communication device 600 may implement the corresponding operations implemented by the mobile terminal/terminal device in each method of the embodiments of the disclosure. For brevity, details are not described herein.

Figure 7:
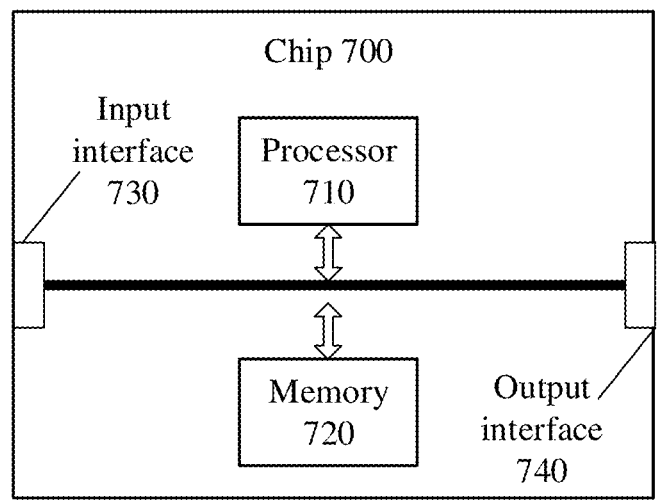
FIG. 7 is a schematic structural diagram of a chip according to an embodiment of the present disclosure.

FIG. 7 is a schematic structural diagram of a chip according to an embodiment of the present disclosure. The chip 700 illustrated in FIG. 7 includes a processor 710 that may invoke and execute a computer program from a memory to implement the method of the embodiments of the present disclosure.

Alternatively, as illustrated in FIG. 7, the chip 700 may further include a memory 720. The processor 710 may invoke and execute a computer program from the memory 720 to implement the method of the embodiments of the present disclosure.

The memory 720 may be a separate device independent of the processor 710, or may be integrated into the processor 710.

Alternatively, the chip 700 may further include an input interface 730. The processor 710 may control the input interface 730 to communicate with other devices or chips, and specifically, may obtain information or data transmitted by the other devices or chips.

Alternatively, the chip 700 may further include an output interface 740. The processor 710 may control the output interface 740 to communicate with other devices or chips, and specifically, may output information or data to other devices or chips.

Alternatively, the chip may be applied to the network device in the embodiments of the present disclosure, and the chip may implement the corresponding operations implemented by the network device in each method of the embodiments of the present disclosure. For brevity, details are not described herein.

Alternatively, the chip may be applied to the mobile terminal/terminal device in the embodiments of the present disclosure, and the chip may implement the corresponding operations implemented by the mobile terminal/terminal device in each method of the embodiments of the present disclosure. For brevity, details are not described herein.

It should be understood that the chip mentioned in the embodiments of the present disclosure may also be referred to as a system-level chip, a system chip, a chip system, or a system-on-chip.

Figure 8:
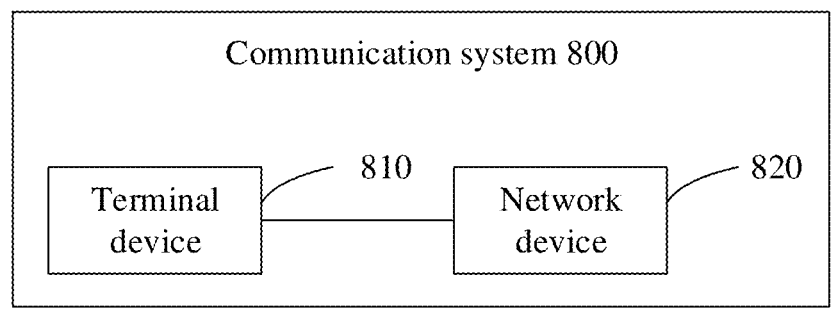
FIG. 8 is a schematic block diagram of a communication system according to an embodiment of the present disclosure.

FIG. 8 is a schematic block diagram of a communication system 800 according to an embodiment of the present disclosure. As illustrated in FIG. 8, the communication system 800 includes a terminal device 810 and a network device 820.

The terminal device 810 may be configured to implement a corresponding function implemented by the terminal device in the method described above, and the network device 820 may be configured to implement a corresponding function implemented by the network device in the method described above. For brevity, details are not described herein.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor described above may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, step and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

An embodiment of the disclosure further provides a computer-readable storage medium, which is configured to store a computer program.

Alternatively, the computer-readable storage medium may be applied to a network device in the embodiments of the disclosure, and the computer program enables a computer to execute corresponding operations implemented by the network device in each method of the embodiments of the disclosure. For simplicity, elaborations are omitted herein.

Alternatively, the computer-readable storage medium may be applied to a mobile terminal/terminal device in the embodiments of the disclosure, and the computer program enables a computer to execute corresponding operations implemented by the mobile terminal/terminal device in each method of the embodiments of the disclosure. For simplicity, elaborations are omitted herein.

An embodiment of the disclosure further provides a computer program product, which includes a computer program instruction.

Alternatively, the computer program product may be applied to a network device in the embodiments of the disclosure, and the computer program instruction enables a computer to execute corresponding operations implemented by the network device in each method of the embodiments of the disclosure. For simplicity, elaborations are omitted herein.

Alternatively, the computer program product may be applied to a mobile terminal/terminal device in the embodiments of the disclosure, and the computer program instruction enables the computer to execute corresponding operations implemented by the mobile terminal/terminal device in each method of the embodiments of the disclosure. For simplicity, elaborations are omitted herein.

An embodiment of the disclosure further provides a computer program.

Alternatively, the computer program may be applied to a network device in the embodiments of the disclosure, and the computer program runs in a computer to enable the computer to execute corresponding operations implemented by the network device in each method of the embodiments of the disclosure. For simplicity, elaborations are omitted herein.

Alternatively, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

The embodiments of the present disclosure provide a method and apparatus for determining a TA, and a terminal device.

The method for determining a TA provided by the embodiments of the present disclosure includes the following operations.

A terminal device calculates a first TA value according to position information of the terminal device and ephemeris information of a satellite.

The terminal device determines a second TA value according to the first TA value and a first adjustment value. The second TA value is used for the terminal device to perform uplink synchronization.

An apparatus for determining a TA provided by the embodiments of the present disclosure is applied to a terminal device, and includes a calculation unit and a determination unit.

The calculation unit is configured to calculate a first TA value according to position information of the terminal device and ephemeris information of a satellite.

The determination unit is configured to determine a second TA value according to the first TA value and a first adjustment value. The second TA value is used for the terminal device to perform uplink synchronization.

The terminal device provided by the embodiments of the present disclosure includes a processor and a memory. The memory is configured to store a computer program, and the processor is configured to invoke and execute the computer program stored in the memory to perform the abovementioned method for determining a TA.

A chip provided by the embodiments of the present disclosure is configured to implement the abovementioned method for determining a TA.

Specifically, the chip includes a processor configured to invoke and execute a computer program in a memory, to cause a device installed with the chip to perform the abovementioned method for determining a TA.

A computer readable storage medium provided by the embodiments of the present disclosure is configured to store a computer program, which causes a computer to perform the abovementioned method for determining a TA.

A computer program product provided by the embodiments of the present disclosure includes computer program instructions, which cause a computer to perform the abovementioned method for determining a TA.

A computer program provided by the embodiments of the present disclosure, when executed on a computer, causes the computer to perform the abovementioned method for determining a TA.

By the abovementioned technical solution, the terminal device calculates a latest TA value (that is, the first TA value) according to the position information of the terminal device and the ephemeris information of the satellite, then adds a TA adjustment value (that is, the first adjustment value) to the latest TA value to obtain a final TA value (that is, the second TA value). The final TA value considers the constantly changing position relationship between the terminal device and the satellite and the TA adjustment value indicated by the network side, so that the accuracy is high, and the accuracy of uplink synchronization of the terminal device is improved.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that regarding specific operating processes of the system, device and unit described above, reference may be made to the corresponding processes in the method embodiment. The operating processes are not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be omitted or not executed. In addition, coupling or direct coupling or communication connection between displayed or discussed components may be indirect coupling or communication connection implemented through some interfaces, the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, all functional units in each embodiment of the disclosure may be integrated into a processing unit, or each functional unit may also physically exist independently, and two or more than two functional units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The foregoing is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for determining a Timing Advance (TA), comprising:
   calculating, by a terminal device, a first TA value according to position information of the terminal device and ephemeris information of a satellite; and
   determining, by the terminal device, a second TA value according to the first TA value and a first adjustment value, wherein the second TA value is used for the terminal device to perform uplink synchronization,
   wherein the first adjustment value is determined based on N TA commands received by the terminal device, where N is a positive integer, and N is greater than or equal to 2;
   wherein the method further comprising:
   receiving, by the terminal device, the N TA commands, and determining an accumulated value of N TA adjustment values carried in the N TA commands to be the first adjustment value, wherein each of the N TA commands carries a respective TA adjustment value.

2. The method of claim 1, further comprising:
   receiving, by the terminal device, first signaling sent by a network device, wherein the first signaling carries the first adjustment value.

3. The method of claim 2, wherein the first signaling is a first TA command.

4. The method of claim 3, wherein
   the first TA command is a TA command received by the terminal device before calculating the first TA value; or
   the first TA command is a TA command received by the terminal device when calculating the first TA value; or
   the first TA command is a TA command received by the terminal device after calculating the first TA value.

5. The method of claim 3, wherein in a case that the first TA command is a TA command carried in a Random Access Response (RAR), the method further comprises:
   receiving, by the terminal device, the RAR sent by the network device, and determining a TA adjustment value carried in the TA command in the RAR to be the first adjustment value.

6. The method of claim 3, wherein in a case that the first TA command is a TA command carried in a Media Access Control Control Element (MAC CE), the method further comprises:
   receiving, by the terminal device, the MAC CE sent by the network device, and determining a TA adjustment value carried in the TA command in the MAC CE to be the first adjustment value.

7. The method of claim 1, wherein the receiving, by the terminal device, the N TA commands comprises:
   receiving, by the terminal device, the N TA commands before calculating the first TA value;
   receiving, by the terminal device, a part of the N TA commands before calculating the first TA value, and receiving another part of the N TA commands after calculating the first TA value; or
   receiving, by the terminal device, the N TA commands after calculating the first TA value.

8. The method of claim 1, wherein the N TA commands comprise at least one of:
   at least one TA command carried in an Random Access Response (RAR); or
   at least one TA command carried in a Media Access Control Control Element (MAC CE).

9. A terminal device, comprising:
   a processor;
   a transceiver; and
   a memory for storing a computer program executable by the processor,
   wherein the processor is configured to:
   calculate a first Timing Advance (TA) value according to position information of the terminal device and ephemeris information of a satellite; and
   determine a second TA value according to the first TA value and a first adjustment value, wherein the second TA value is used for the terminal device to perform uplink synchronization,
   wherein the first adjustment value is determined based on N TA commands received by the terminal device, where N is a positive integer, and N is greater than or equal to 2;
   wherein the transceiver is further configured to receive the N TA commands; and
   the processor is configured to determine an accumulated value of N TA adjustment values carried in the N TA commands to be the first adjustment value, wherein each of the N TA commands carries a respective TA adjustment value.

10. The terminal device of claim 9, wherein the transceiver is configured to:
    receive first signaling sent by a network device, wherein the first signaling carries the first adjustment value.

11. The terminal device of claim 10, wherein the first signaling is a first TA command.

12. The terminal device of claim 11, wherein
    the first TA command is a TA command received by the terminal device before calculating the first TA value; or
    the first TA command is a TA command received by the terminal device when calculating the first TA value; or
    the first TA command is a TA command received by the terminal device after calculating the first TA value.

13. The terminal device of claim 11, wherein in a case that the first TA command is a TA command carried in a Random Access Response (RAR),
    the transceiver is configured to receive the RAR sent by the network device; and the processor is configured to determine a TA adjustment value carried in the TA command in the RAR to be the first adjustment value.

14. The terminal device of claim 11, wherein in a case that the first TA command is a TA command carried in a Media Access Control Control Element (MAC CE),
the transceiver is configured to receive the MAC CE sent by the network device; and
the processor is configured to determine a TA adjustment value carried in the TA command in the MAC CE to be the first adjustment value.

15. The terminal device of claim 9, wherein the transceiver is configured to:
receive the N TA commands before calculating the first TA value; or
receive a part of the N TA commands before calculating the first TA value, and receive another part of the N TA commands after calculating the first TA value; or
receive the N TA commands after calculating the first TA value.

16. The terminal device of claim 9, wherein the N TA commands comprise at least one of:
at least one TA command carried in an Random Access Response (RAR); or
at least one TA command carried in a Media Access Control Control Element (MAC CE).

* * * * *